United States Patent [19]

Diekmeier et al.

[11] Patent Number: 5,287,454
[45] Date of Patent: Feb. 15, 1994

[54] METHOD FOR ACQUIRING NETWORK KNOWLEDGE ABOUT A DIGITAL TRANSMISSION NETWORK

[75] Inventors: Martin Diekmeier, Dieburg; Eckhart Flor, Reinheim; Klemens Hahn, Weiterstadt; Gerhard Himmel, Weinheim; Helmut Wolf, Pfungstadt, all of Fed. Rep. of Germany

[73] Assignees: ANT Nachrichtentechnik GmbH, Backnang; Hans Kolbe & Co. Nachrichtenubertragungstechnik, Bad Salzdetfurth; Krone Aktiengesellschaft, Berlin; Quante Aktiengesellschaft, Wuppertal; Siemens Aktiengesellschaft, Munich; Standard Elektrik Lorenz Aktiengesellschaft, Stuttgart; U.S. Philips Corporation, New York

[21] Appl. No.: 646,783
[22] PCT Filed: Jul. 26, 1989
[86] PCT No.: PCT/DE89/00488
  § 371 Date: Jan. 28, 1991
  § 102(e) Date: Jan. 28, 1991

[30] Foreign Application Priority Data
Jul. 26, 1988 [DE] Fed. Rep. of Germany ....... 3825265

[51] Int. Cl.$^5$ .............................................. G06F 13/00
[52] U.S. Cl. .................................................. 395/200
[58] Field of Search .................... 395/200; 370/84, 16, 370/60, 94.1, 94.2, 94.3; 364/222.2, 240.8, 242.94, 940.6, 942.2

[56] References Cited

U.S. PATENT DOCUMENTS

| | | |
|---|---|---|
| 4,049,906 | 9/1977 | Hafner et al. .......................... 370/61 |
| 4,644,532 | 2/1987 | George et al. ....................... 370/94.1 |
| 4,679,189 | 7/1987 | Olson et al. ............................ 370/60 |
| 4,736,363 | 4/1988 | Aubin et al. ........................... 370/60 |
| 4,825,206 | 4/1989 | Brice et al. ............................. 370/16 |
| 4,875,208 | 10/1989 | Furuhashi et al. .................. 370/94.1 |
| 4,905,233 | 2/1990 | Cain et al. ........................... 370/94.1 |
| 5,166,673 | 11/1992 | Hermann et al. ............... 340/825.16 |

FOREIGN PATENT DOCUMENTS

| | | |
|---|---|---|
| 0048853 | 4/1982 | European Pat. Off. . |
| 0214398 | 7/1986 | European Pat. Off. . |
| 2441099 | 3/1975 | Fed. Rep. of Germany . |

Primary Examiner—Arthur G. Evans
Assistant Examiner—Moustafa M. Meky
Attorney, Agent, or Firm—Hill, Steadman & Simpson

[57] ABSTRACT

Method for acquiring network knowledge in the individual operating locations of a digital transmission network having a plurality of network nodes.

Following a computer outage, digital signal connections set up via central computers can no longer be reconstructed within the individual network nodes, so that no emergency operation is possible.

The method is intended to place every participating network node into the position of maintaining the original or momentary path of the digital signal connection given computer outage or to restore it or, respectively, to independently set up or alternately route a connection.

At the start of the digital signal connection, the digital signal is provided with an identifier in every transmission direction in the transmitting network node, this identifier being supplemented in every following, through-connecting and terminating network node. This identifier can be evaluated in each of these network nodes.

The method can be employed in all digital transmission networks having computer-controlled network nodes.

13 Claims, 9 Drawing Sheets

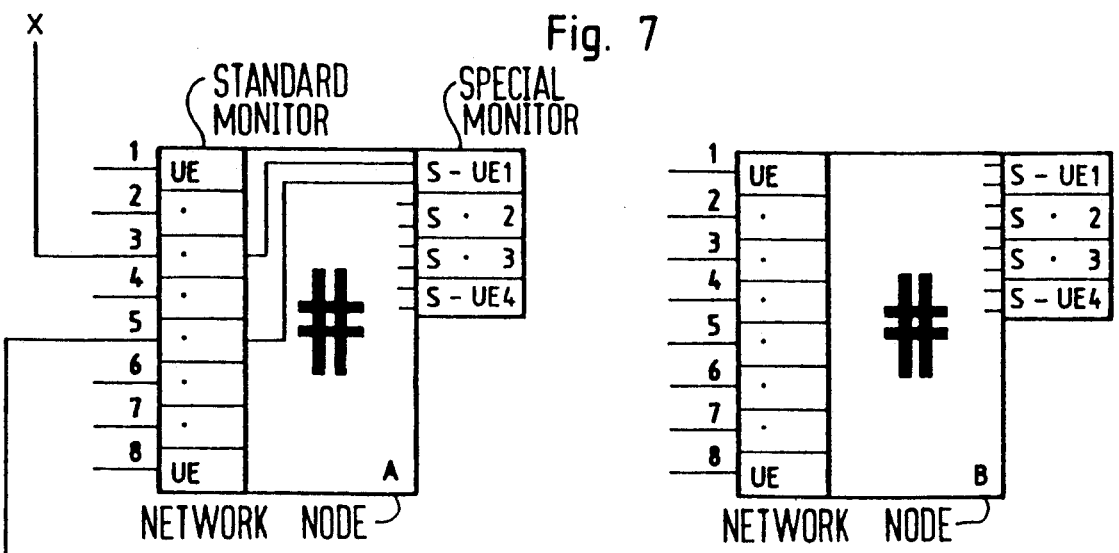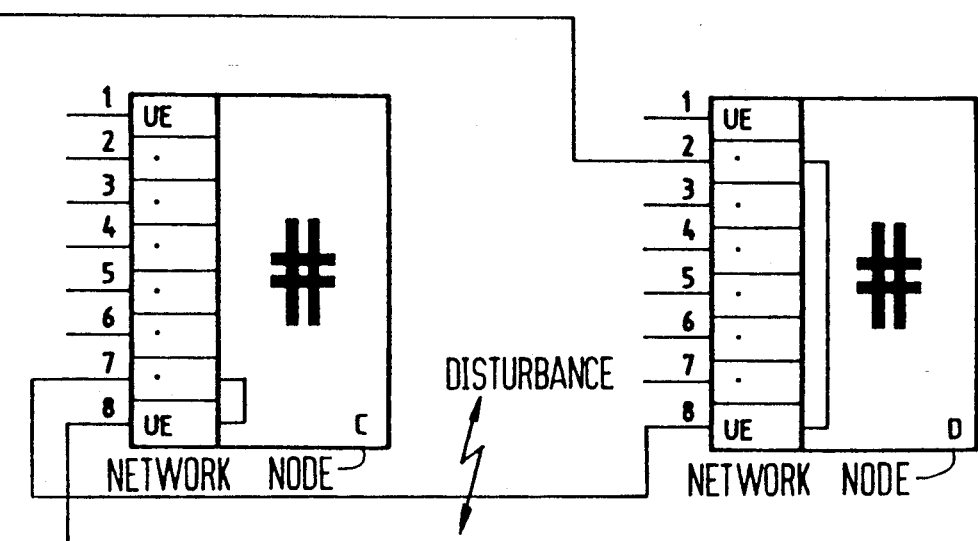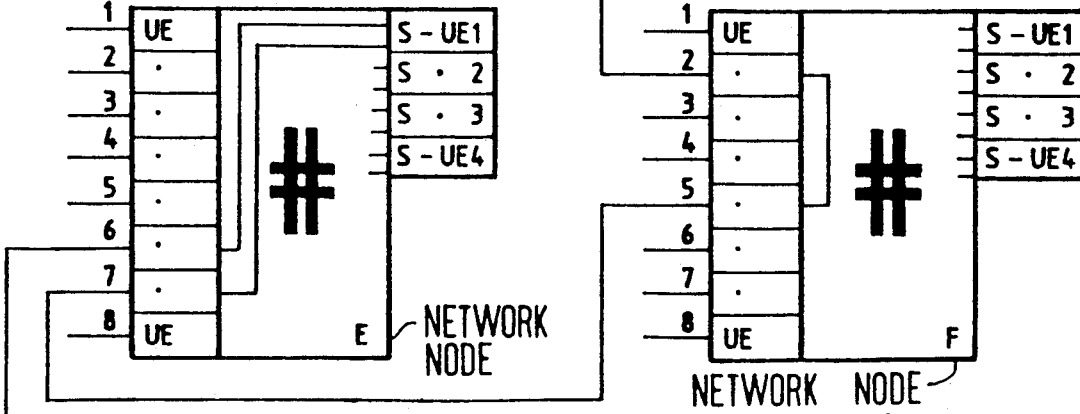

METHOD FOR ACQUIRING NETWORK KNOWLEDGE ABOUT A DIGITAL TRANSMISSION NETWORK

BACKGROUND OF THE INVENTION

The invention is directed to a method for acquiring network knowledge in the individual transmission-associated operating locations of a digital transmission network comprising a plurality of network nodes, whereby an auxiliary information is mixed into the overhead of digital signals for the transmission of said digital signals.

European Patent Application EP 0 048 853 A1, German Published Application DE-OS 24 41 099 and the Proceedings IEEE, Vol. 2, 9.6.1987, International Conference on Communications, 7-10.06.1987, Seattle, Wash. respectively disclosed telephone switching networks having switching centers via which subscribers are connected.

In transmission systems of digital technology, it is prior art that various digital signal connections DSV are further through-connected in the network nodes either as a whole or separated into individual digital signal connections DSV. Distributors wherein these digital signal connections DSV are allocated to the respective equipment corresponding to the desired connection management and, thus, wherein these connections are through-connected are arranged preceding and following every equipment of a hierarchy level.

It is also prior art that these distributors are computer-controlled and are functionally executed as coordination switches. It is likewise known within the course of a computer-controlled digital signal connections DSV that the various multiplexers and the appertaining distributors are combined to form a combined equipment. The distributors and the corresponding multiplexing stages can thus be driven and administered via a central computer. Given faults occurring in the transmission system, this central controller enables a standby circuit as would otherwise be implemented on site with operating personnel. The disadvantage of the prior art is that, given an outage of the central computer, the original path information of a digital signal group can no longer be reconstructed within the network node since all of the information about the line management is situated in the central computer.

The external servicing and display arrangements or, respectively, sub-computers situated in the individual network nodes are not in the position to restore the original or the momentary path of the connection.

European Patent Application EP 0 214 398 A1 discloses a method for monitoring and controlling the traffic in digital transmission networks having network nodes via a control network. Every digital signal thereby contains an identifier that covers information about the traffic conditions of the individual digital connections such as, for example, a continuous numbering of all sources having directional indication or indication of locality or area. The identifier of a desired digital signal connection is communicated via the control network to the appertaining network nodes that are correspondingly controlled. The identifier of the digital signals is also monitored therein. It in fact contains an information about the connection but not about the path, so that a connection can no longer be set up given the absence of path information via the control network.

SUMMARY OF THE INVENTION

It is the object of the invention to specify a method that lends every network node NK the possibility of acquiring the momentary line management of all digital signal groups traversing this network node NK, as well as to create the possibility of enabling a switching of the useful signals via the individual network nodes even given outage of the central computer.

This object is achieved by a method for acquiring network knowledge in the transmission of digital signals having an auxiliary information mixed into their overhead in a digital transmission network. The network has network nodes connected as terminal or tandem nodes that contain electronic distributors having circuits that have network knowledge available to them and to which local computers are connected, digital signal sections connected between the network nodes, a central computer that is connected to the local computers, and digital signal connections that can be switched and monitored from a starting terminal node via tandem nodes to a destination terminal node. The method comprises the steps of: repeatedly transmitting a telegram having a start character, having starter data containing an identifier regarding type of signal and operating mode as well as an identification of both terminal nodes and having an end character by the starting terminal node as auxiliary information; storing the telegram in every tandem node; transmitting a corresponding telegram in the opposite direction; and reporting by both terminal nodes the connection set-up to the central computer and the latter initiating the through-connection of a useful signal or; given outage of the central computer, through-connecting the digital signals in the network nodes on the basis of the stored information of the received telegrams.

The digital signal can be one of a standard useful signal, a useful signal with special structure, a check signal or an alternate signal.

Given a known useful signal having special structure, a corresponding special monitoring unit can be looped in the signal path within defined network nodes.

Given an unknown useful signal having special structure, the method further comprises starting a search run within defined network nodes, this search run successively offering the signal to all special monitoring units within the network nodes until the special monitoring unit corresponding to the special structure has been identified. Given useful signals having special structure, network nodes without corresponding special monitoring units through-connect the signal unmodified.

For a disturbance of the useful signal within a network node affected by the disturbance, a monitoring to a standard useful signal ensues.

Every network node that does not receive a telegram for a defined chronological duration automatically transmits a telegram at regular chronological intervals as a start telegram. Every network node that receives a telegram supplements this telegram with its own information.

The telegram begins with a start signal and a stop signal follows the telegram. Also, the telegram contains information about the first network node and the destination node of the connection and about the networks nodes that have already been traversed. The telegram can be protected by check bits.

The through-connection in the individual network nodes automatically ensues for the digital signal on the basis of the information of the received telegrams and by means of tables stored in the network node.

The method further comprises performing a plurality of automatic path searches over different paths, after which the connecting path that leads via the fewest network nodes is permanently connected. A standard signal is employed in the automatic through-connection (path search).

A switch to an existing special monitoring unit within the participating network node is undertaken only after the through-connection and given transmission of a useful signal having special structure.

For implementing the method, a digital transmission network for transmitting digital signals has a central computer and network nodes with electronic distributors that are connected to one another by digital signal sections and to digital signal sources and sinks or multiplexers. The network comprises equipment for inserting auxiliary information into overhead of the digital signals provided in the digital signal sources and in the multiplexers and comprises local computers and standard monitoring units or special monitoring units that evaluate, check, supplement and forward the auxiliary information provided in the network nodes.

The invention has the advantage that the complete information about the nature and management of the digital signal connections (DSV) conducted via a network node can be communicated to every network node without increasing the existing transmission capacity.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 7 depicts yet another connection of the network nodes; and

DESCRIPTION OF THE PREFERRED EMBODIMENT

The functioning of the method shall be set forth below with reference to an example.

Point of Departure

Figure 1:
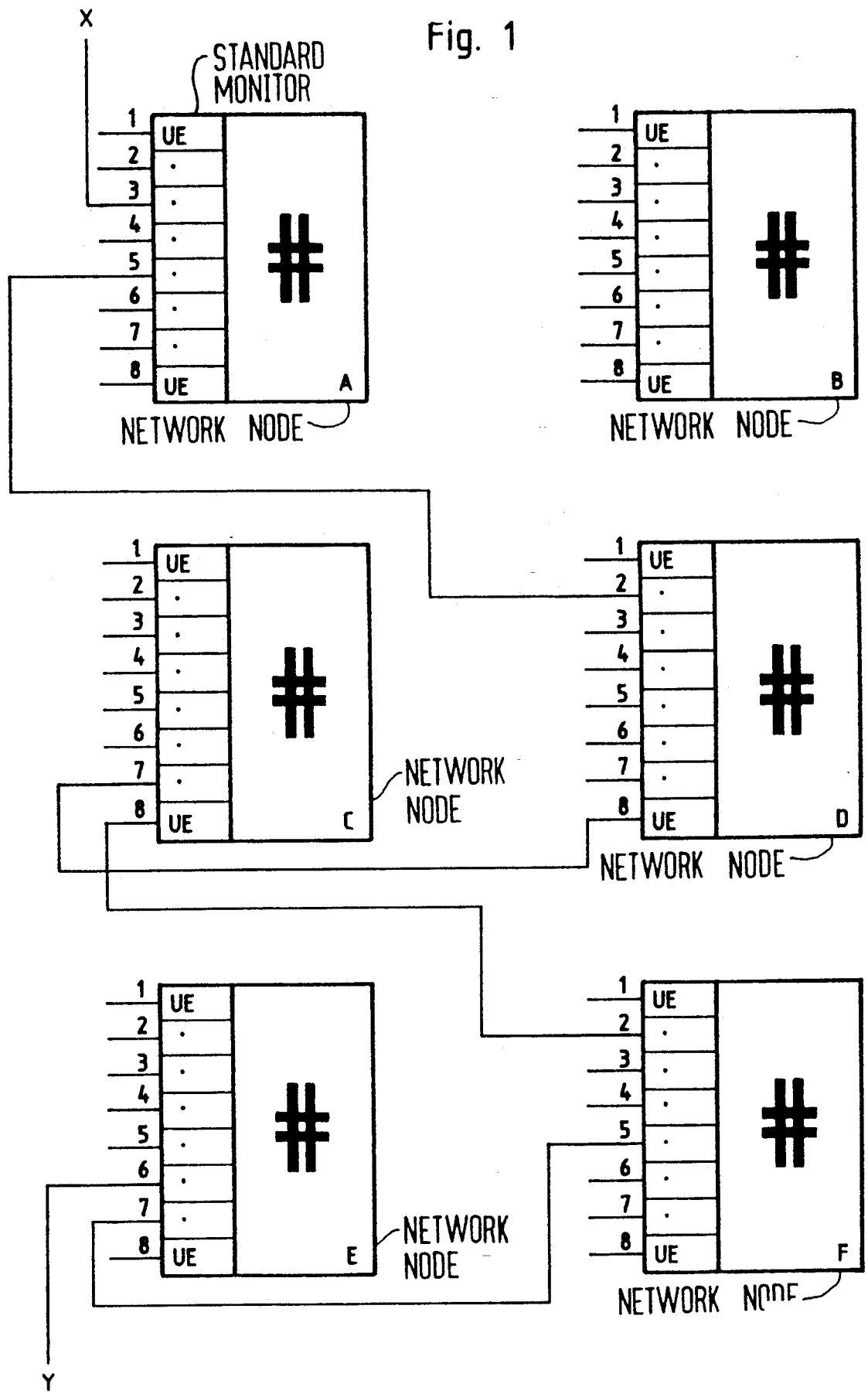
FIG. 1 depicts a network having six nodes.

A network composed of the 6 network nodes A, B, C, D, E, F having electronic distributors shall be considered (FIG. 1).

Figure 3:
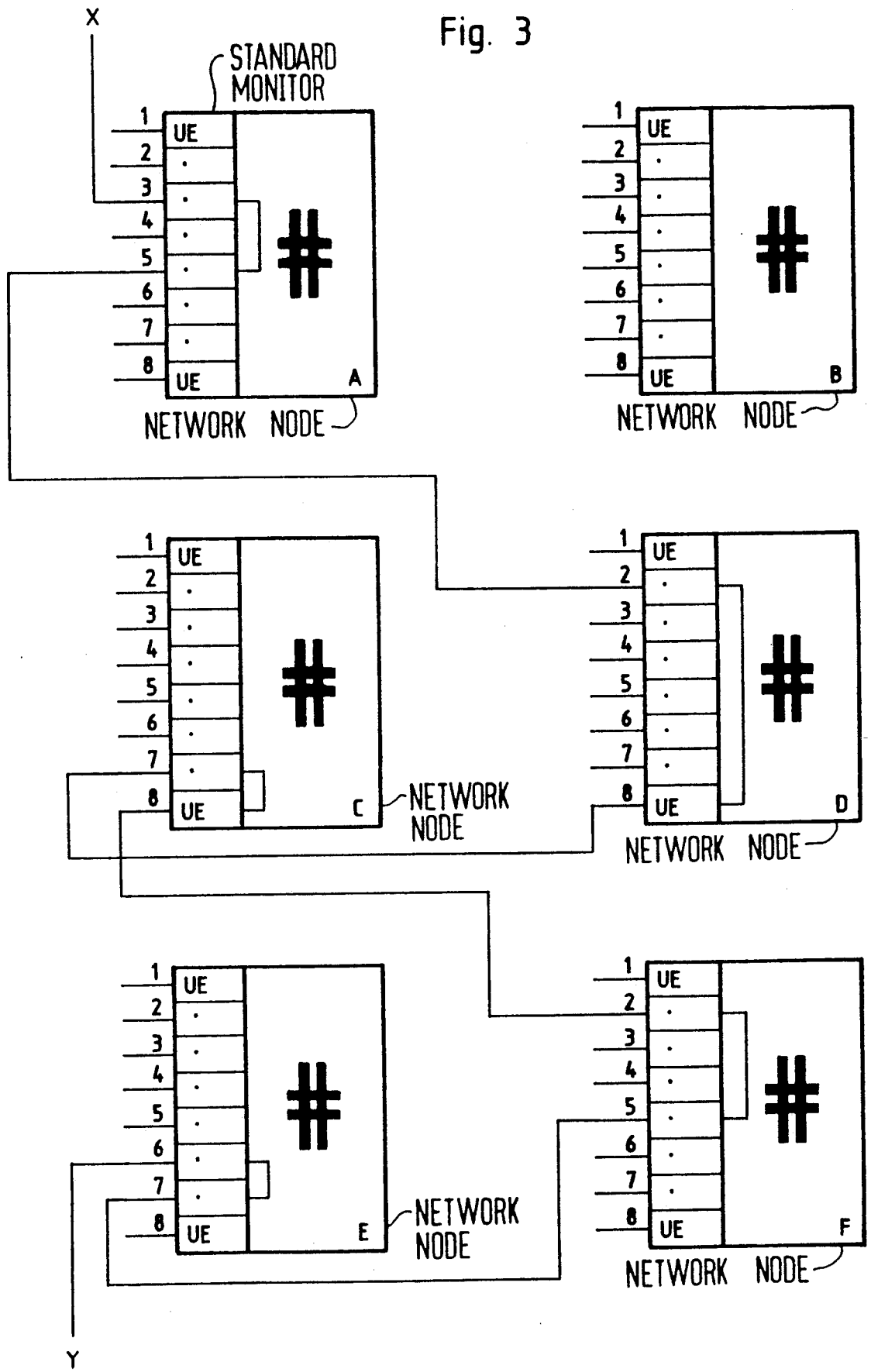
FIG. 3 depicts a further connection of the network nodes.

2. The electronic distributors are controlled by local computers that execute and monitor the hardware functions of the network nodes.
3. Circuits in the distributors are initiated by a central computer that has corresponding network knowledge available to it and to which the local computers are connected.
4. The link between two network nodes shall be referred to below as digital signal section (DSA), for example FIG. 1, A5-D2.
5. The entire, through-connected connection from the first up to the last network node (FIG. 3, X-Y, whereby X and Y can be either multiplexers or sources/sinks) shall be referred to below as digital signal connection (SDV).

The incoming digital signals are monitored by the standard monitoring units (UE 1-8) at the inputs of the electronic distributors for:

NDS = useful digital signal
PDS = check digital signal
EDS = alternate digital signal
AIS = alarm indication signal
KDS = lack of any all input signal
Quality and Availability parameter.

7. NDS denotes that the DSA is in the course of a connected DSV that carries a normally structured signal.
8. EDS denotes that the DSA itself is not disturbed but is situated in the course of a disturbed DSV.
9. PDS denotes that the DSA is free.
10. AIS and KDS indicate that the DSA itself is directly disturbed.
11. AIS is an unstructured signal.
12. NDS, PDS and EDS are structured in accord with the normal frame standard in the network. They carry a data channel in the frame. A decision can be made with reference to the information conducted therein whether NDS, PDS or EDS is involved. This allows all DSA that are not directly disturbed to be always monitored for quality and availability with the assistance of the standard monitoring units (UE).
13. Insofar as the standard structure is recognized, the reception of valid/allowable information in the data channel is additionally monitored.

Functioning of the Method

1. For testing during the installation of DSV and for monitoring existing DSV, data are transported in the data channel according to the following principle: The terminal nodes of a DSV (FIG. 1, A and E) send a telegram having starter data in the direction of the opposite end. For every following node in the DSV reads the arriving telegram, checks it and appends further information (transit data) of its own before it forwards the telegram.

The terminal nodes must repeatedly transmit their telegrams, whereby the maximum time between two telegram starts is defined. The following network nodes monitor the arrival of the telegrams. When no allowable telegrams are received over a time span that is longer than n times the maximum time between telegram starts (n, for example = 3), then the corresponding network node itself begins to output a telegram as auxiliary starter. All following nodes can thus recognize the location of the disturbance.

The telegrams contain the following information:
ST (start character)
Starter data
  the transit data of the tandem node per tandem node traversed
ET (end character).

For protection of the telegram data, check bits are inserted and, for example, work is carried out with over-sampling and important parts of the information are transmitted multiply, even inverted.

The starter data are composed of:
Identifier (Kxyz) as starter or, respectively auxiliary starter with type of signal and operating node
Identification of the destination node
Identification of the destination port at the destination node
Identification of the transmitting node
Identification of the incoming port
Identification of the outgoing port.

The transit data contain:
Identifier (Kxyz) as tandem node having type of signal and operating node
Identification of the tandem node
Identification of the input port
Identification of the output port.

The identifier (Kxyz) is mnemonically presented in this specification. Denoting in detail are:
K: identifier
x=E: alternate digital signal (EDS)
P: check signal (PDS)
N: useful digital signal having normal structure (NDS)
S: useful digital signal having special structure (SNDS)
y=N: normal starter (terminal node)
B: auxiliary starter
D: tandem node
z=U: monitoring operating node
V: connection check operating node Insofar as that part of the signal overhead that is used as data channel for the telegrams is already occupied with information in some other way, these information are likewise transmitted in the telegram between the network nodes.

2. Quiescent Condition

The telegrams are exchanged on DSA that are not through-connected (for example, FIG. 1, between A5 and D2):

| A5 → D2 | ST, KPNU, D0, A0:5, ET |
|---|---|
| D2 → A5 | ST, KPNU, A0, D0:2, ET |

A0 and D0 are non-existent dummy start or, respectively, end ports. They indicate that no through-connection is carried out in the node.

3. Switching a DSV

Figure 2:
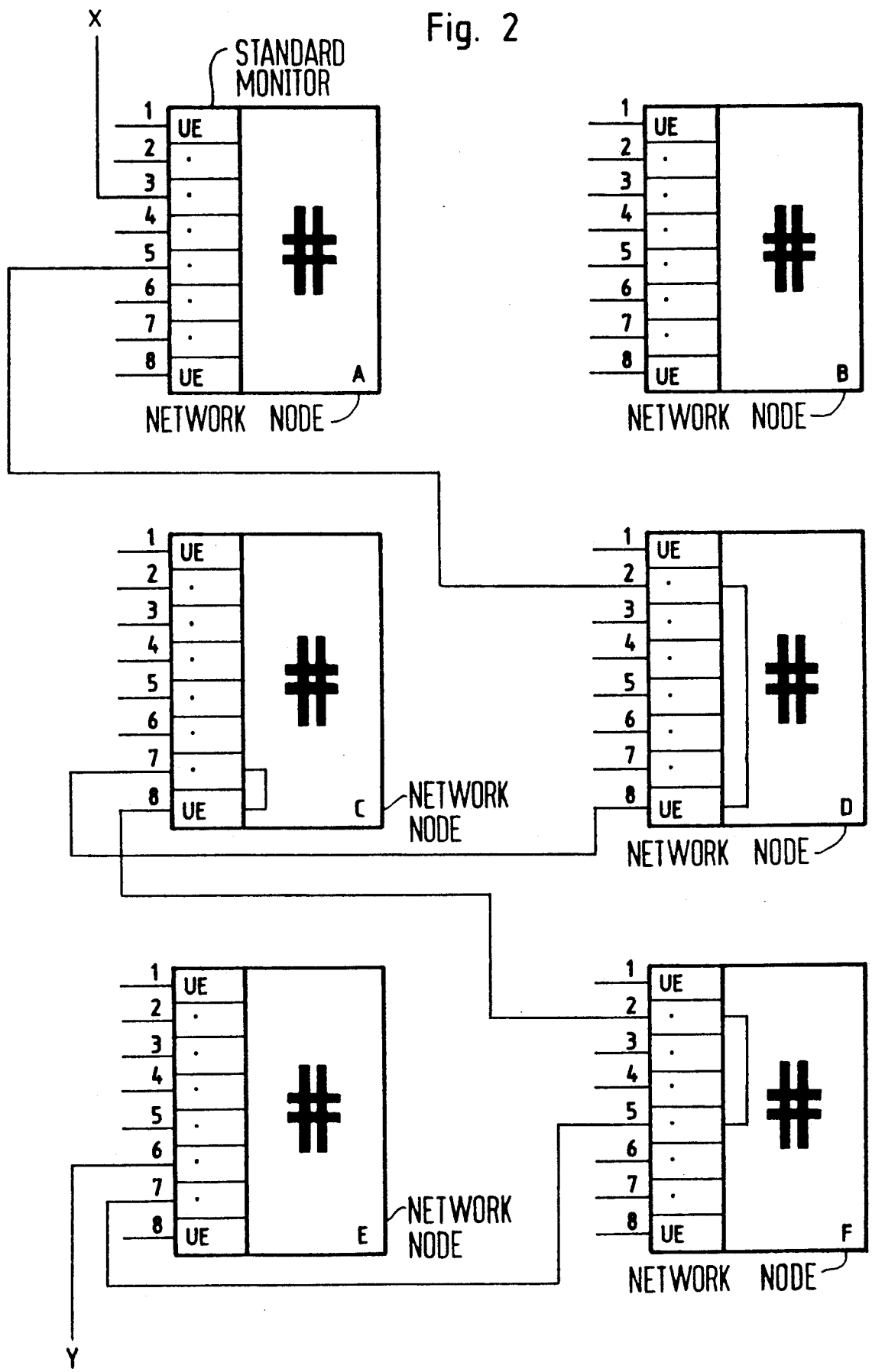
FIG. 2 depicts another connection of the network nodes.

The central computer calculates a path and gives every participating network node a switching instruction having the following content:
  Switch Port n to m; Terminal node of the DSV
  Example, FIG. 2, switching the DSV from X to Y via A-D-C-F-E:

| Switching Instructions to: | A: 0, 5; A0, E0 |
|---|---|
| | D: 2, 8; A0, E0 |
| | C: 7, 8; A0, E0 |
| | F: 2, 5; A0, E0 |
| | E: 7, 0; A0, E0 |

A0 and E0 are dummy ports. The terminal nodes A and E do not initially through-connect. The tandem nodes D, E and F through-connect.

A and E recognize from the switching instruction that the DSV ends at them and start the check phase in that they output check telegrams in the direction of the opposite terminal point.

The following telegrams are transmitted from A to E in the check phase:
A—>D; ST,KPNV,E0,A0:5,ET
D—>C; ST,KPNV,E0,A0:5,KPDV,D2:8,ET
C—>F: ST,KPNV,E0,A0:5,KPDV,D2:8,KPDV,C7:8,ET
F—>E: ST,KPNV,E0,A0:5,KPDV,D2:8,KPDV,C7:8,KPDV,F2:5,ET The node E can recognized with reference to the incoming telegram whether the switching has correctly ensued.

The analogous procedure is implemented for the opposite direction.

Subsequently, the terminal nodes A and E report the correct through-connection to the central computer that then forwards the through-connect instructions to the terminal nodes.

| Switching instructions to: | A: 3, 5; A3, E6 |
|---|---|
| | E: 7, 6: A3, E6 |

When the through-connection has been accomplished (FIG. 3), the DSV carries a useful signal (NDS). A switch to monitoring node is undertaken and the transmitted information change accordingly.
Example of telegrams from A to E:
A—>D: STN,KNNU,E6,A3:5,ET
D—>C: ST,KNNU,E6,A3:5,KNDU,D2:8,ET
C—>F: ST,KNNU,E6,A3:5,KNDU,D2:8,KNDU,C7:8,ET
F—>E: ST,KNNU,E6,A3:5,KNDU,D2:8,KNDU,KNDU,F2:5,ET The analogous case applies to the opposite direction.

All network nodes via which a DSV is switched thus obtain the information about the entire management thereof in the network. Potential changes in management caused by standby circuits are automatically brought to the attention of the nodes.

4. Error Detection and Handling

In case one of the tandem nodes is not in the position to execute the required switching (for example, due to a fault in the switching matrix network), then it reports this to the central computer and transmits to the affected ports as auxiliary starter with EDS. The central computer must then clear down the connection and seek another path in the network.

In case one of the terminal nodes cannot through-connect, the central computer is informed thereof and a telegram is simultaneously sent as auxiliary starter with EDS to the cooperating location.
  Example, FIG. 2, A cannot through-connect to Port 3.

E then receives the telegram ST,KEBV,E6,A0:5,KEDV,D2:8,KEDV,C7:8,KEDV,F2:5,ET and can recognize that a fault is present in A and the DSV is thus not switched.

Figure 4:
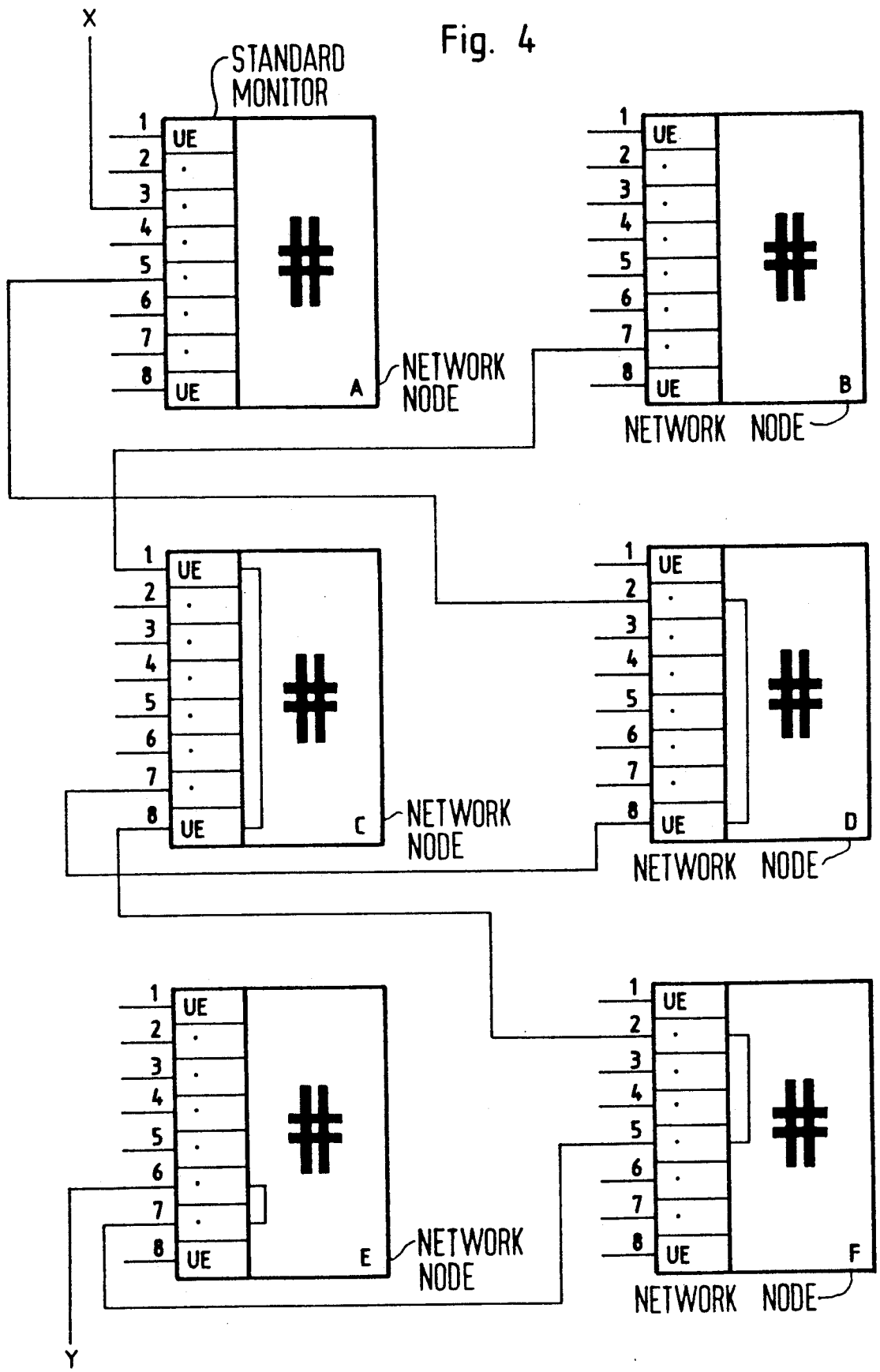
FIG. 4 depicts yet another connection of the network nodes.

When incorrect switching was carried out in a node (for example, in node C in FIG. 4), then the node D continues to receive ST,KPNU,D0,C0:7,ET at Port 8. After a defined waiting time, D now begins to independently work as auxiliary starter in direction A. A thus receives the telegram:
ST,KEBV,A0,D0:2,ET and knows that a fault must lie in front of node D.

Two cases are possible for node F:
it continues to receive the check signal for unwired DSA at Port 2 or
it receives a check or useful signal that, however, does not contain the correct starting and end nodes E and A.

In both instances, it begins to work in direction E as auxiliary starter, so that the terminal node E is also informed about the fault location.

Figure 5:
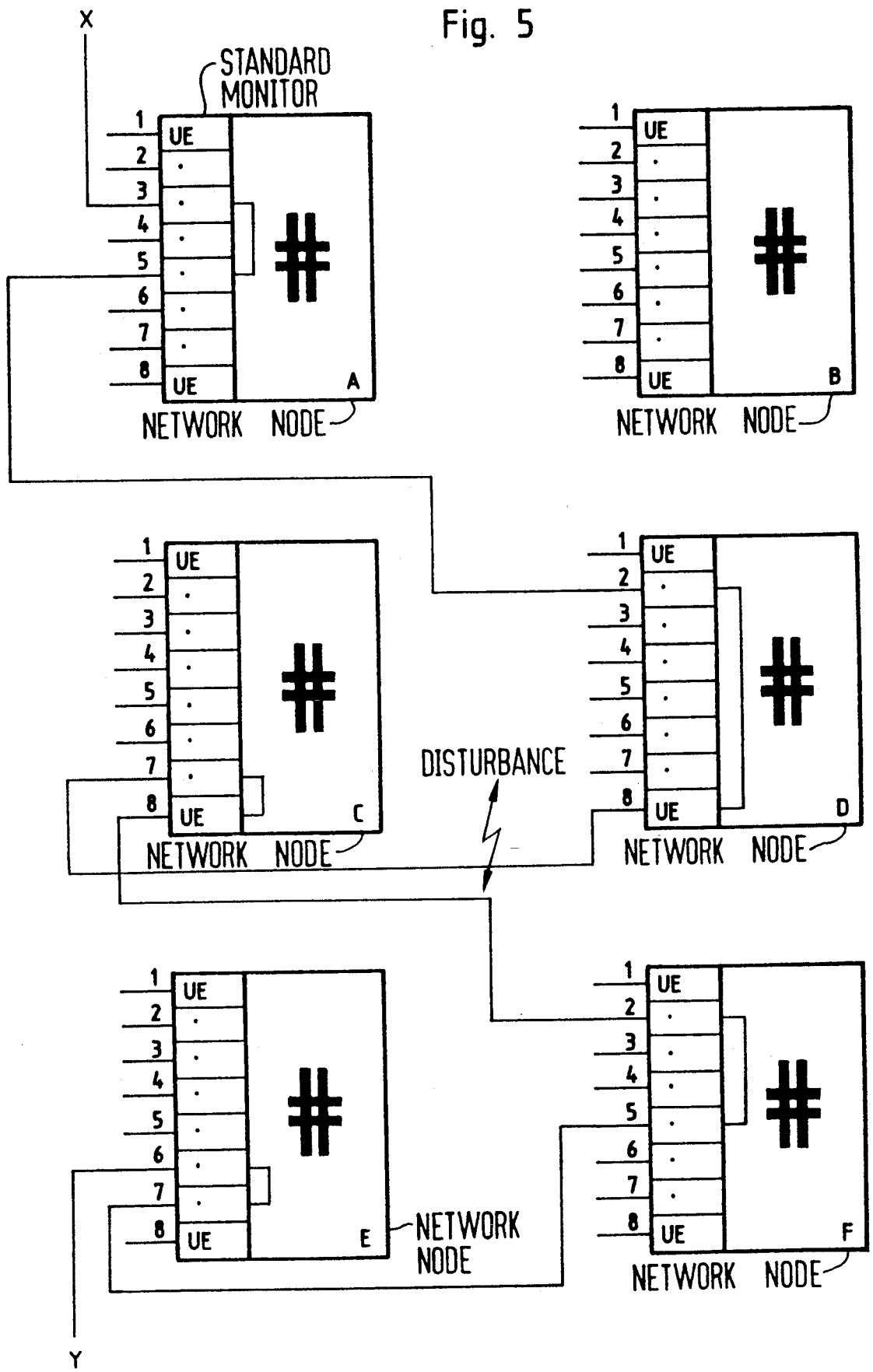
FIG. 5 depicts another connection of the network nodes.

When an existing DSV is interrupted or disturbed, then the nodes over the course of the DSV receive information about the location of the disturbance (FIG. 5). The nodes C and D recognize either KDS or AIS at their Ports 7 or, respectively, 8. Departing therefrom, they respectively set EDS (see via Port 8, D via Port 2).

The terminal nodes receive the information about the fault by the telegrams 2
A: ST,KEBU,A3,D0:2,ET
E: ST,KEBU,E6,C0:8,KEDU,F2:5,ET.

5. Monitoring Digital signals with Special Structures

When digital signals that do not have the structure that is otherwise usual must be carried in the network, then it is not possible to monitor these with the assistance of the standard monitoring units (UE) present at every input of the electronic distributors.

In order, in particular, to also be able to monitor quality and availability, separate monitoring units must be utilized.

There is then the possibility of replacing the standard monitoring units at the distributor inputs with units associated to the special signals. Certain DSA are thus, however, permanently allocated to these signal types in hardware terms. This has a disadvantageous effect on the flexibility of the DSV management and alternate switching possibility.

Figure 6:
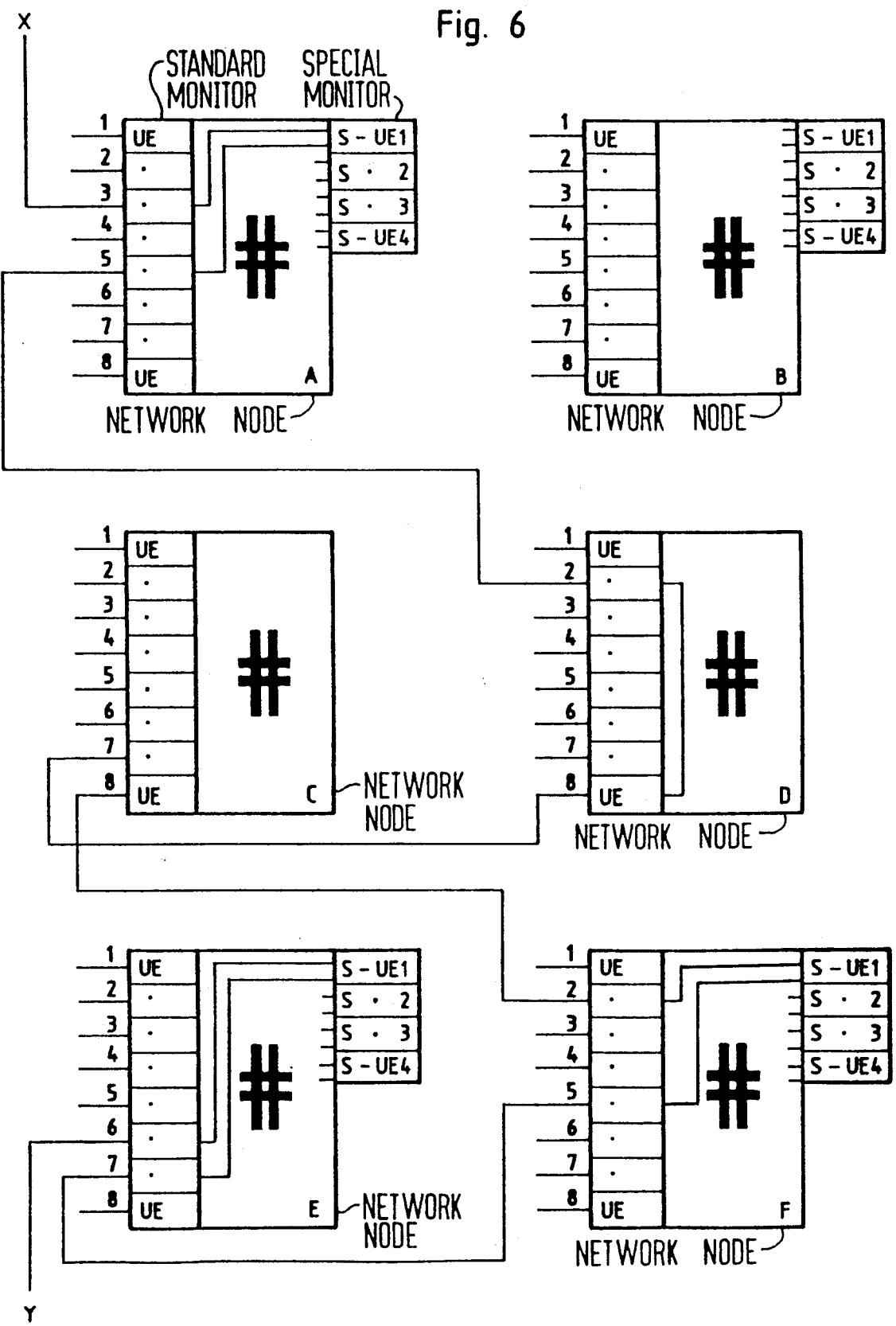
FIG. 6 depicts a further connection of the network nodes.

In order to avoid these disadvantages, it is therefore proposed herein to leave the standard monitoring units at the input ports of the network nodes and to loop the DSV having special structure via special monitoring units (S-UE 1-4) arranged at the distributors (FIG. 6).

The set-up of such a DSV up to and including the check phase is nearly identical to that of a normal DSV.

Two additional functions are required:
The switching instruction from the central computer must contain a supplementary information about the type of special signal involved.
The appertaining network nodes then loop the connection via the corresponding special monitoring unit. Network nodes that do not have a suitable monitoring unit directly through-connect.

In the check-phase, the DSV is monitored with the assistance of the normal monitoring units upon application of the PDS that has the normal structure available.

In the nodes where the DSV is looped via special monitoring units, these will in fact indicate the lack of a structure suitable for them as a fault; since the local control computer, however, knows that the check phase is still involved, it can suppress these alarms.

The signal conducting in the DSV receives the special structure with the through-connection in the terminal nodes. The standard monitoring units in all participating nodes will thus indicate the lack of a suitable structure as fault. Since, however, the respective, local control computers know that a special signal is being carried in the DSV, they suppress these alarms and release the alarms to the special monitoring units that now no longer indicate any faults insofar as a real malfunction is not present.

Since the telegrams with the command and control information are carried in the frame of the digital signals, these must now be read, monitored and supplemented by the special monitoring units. The command and control information about the nodes that do not have suitable special monitoring units available thus disappear from the telegrams.

The precise localization of a potential disturbance, however, is then still possible (FIG. 7). To that end, it is necessary that the standard monitoring units continue to monitor the signal and attempt to find the normal frame structure. Only the forwarding of their alarms must be suppressed.

In case of a disturbance (FIG. 7), the nodes recognize
D: KDS or AIS at Port 8
C: KDS or AIS at Port 7
with their standard monitoring units.

In response thereto, they set EDS in outgoing direction (i.e, via C8 or, respectively, D2) and work as auxiliary starters. The normal frame structure (EDS) is recognized at all following nodes and the DSV changes into the same condition as though a DSV having standard structure were interrupted. As a result thereof, a maximum of information can nonetheless be made available at the terminal nodes in case of a fault with a minimum number of special monitoring units. This method offers the following advantages:
special signals can be carried on arbitrary paths in the network, i.e. no fixed (hardware-wise) allocation of DSA to defined signal types need ensue. Routing changes such as, for example, alternate routing, are unproblematically possible; the network remains flexible.
It is adequate per DSV with special signal to install one special monitoring unit per terminal node, as a result whereof the outlay for routing such signals in the network is greatly reduced.

6. Searching and Switching a DSV Route Without Central Computer for DSV Having Standard Structure Given the lack or outage of the central computer, the signals and telegrams introduced for monitoring purposes can also be utilized to find and through-connect a connecting path proceeding from a terminal node of a DSV to be switched.

To this end, every local computer must keep lists that indicate the neighboring node to which a connection is to be through-connected when this connection is to end at a defined destination node.

Figure 8:
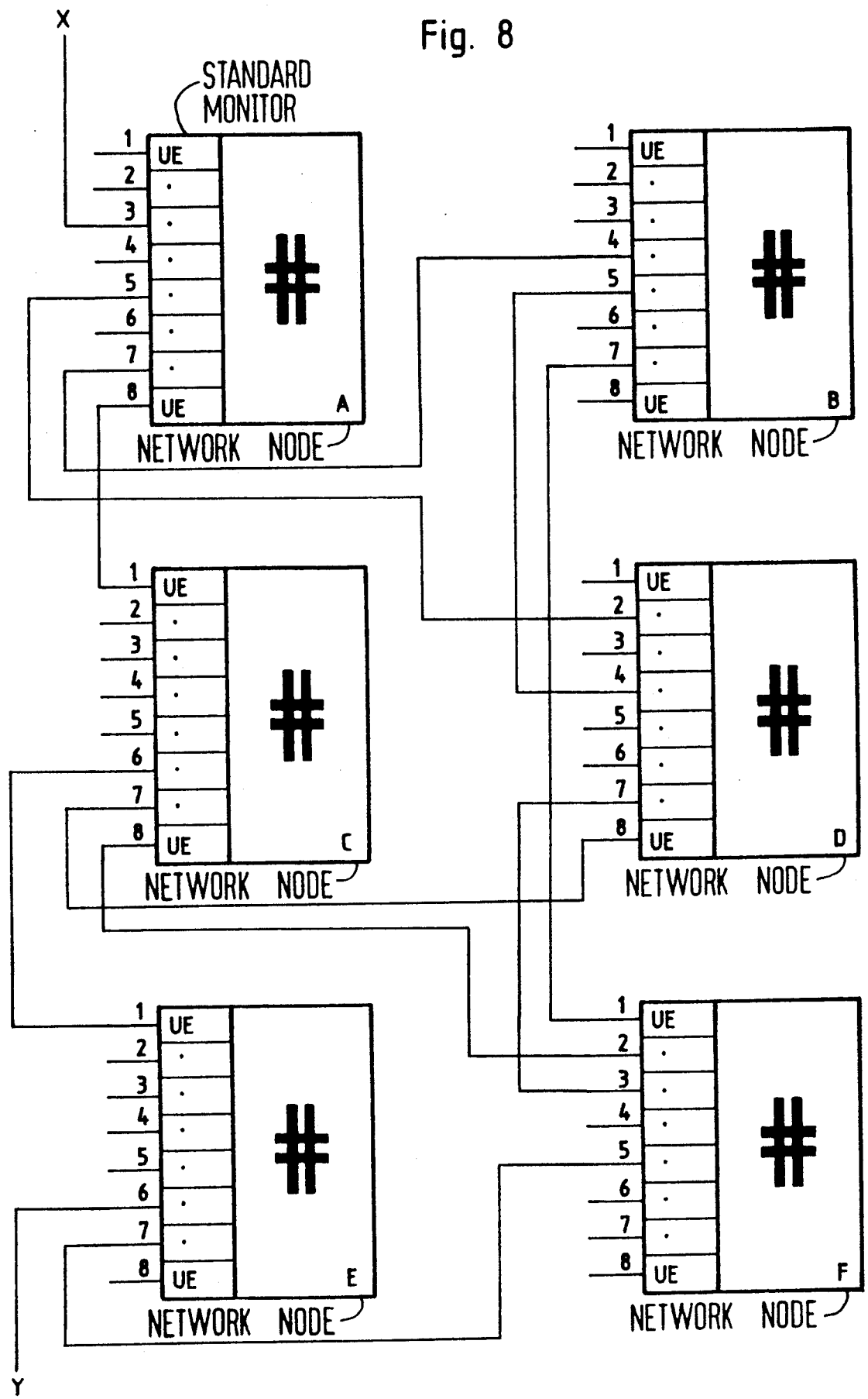
FIG. 8 depicts another connection of the network nodes.

For example, the following lists would have to be provided for the nodes for the example in FIG. 8:

| List in Node | Destination Node | Neighboring Node | | | |
|---|---|---|---|---|---|
| | | 1. | 2. | 3. | Attempt |
| A | E | C | D | B | |
| B | E | F | D | A | |
| C | E | E | F | D | |
| D | E | C | F | | |
| F | E | E | C | | |

All DSA are initially unswitched and the check signal is respectively exchanged on them.

A starts the set-up of the connection A3-E6 in that it sends the following telegram to node C via Port 8 according to its list:

ST,KPNV,E6,A3:8,ET

Thereupon, node C through-connects via Port 1 onto Port 6 to E according to its list and forwards the supplemented telegram:

ST,KPNV,E6,A3:8,KPDV,C1:6,ET

Node E recognizes that it is the terminal node and answers back to A insofar as it is in the position to through-connect to E6:

E—>C ST,KPNV,A3,E6:1,ET

A thus receives:

ST,KPNV,A3,E6:1,KPDV,C6:1,ET and knows that the connection is in place up to E and can also be switched to the destination.

A through-connects and also initiates the through-connection at E in that it switches the operating mode from connection check to monitoring and from PDS to NDS in the identifier.
A—>C: ST,KNNU,E6,A3:8,ET
C—>E: ST,KNNU,E6,A3:8,KNDU,C1:6,ET
The DSV is switched after the through-connection at E and the normal monitoring telegrams are transmitted in both directions.

When the node E cannot through-connect to the destination (Port 6) because, for example, this is already connected elsewhere, then it answers back as auxiliary starter:

ST,KPBV,A3,E6:1,ET

Since E is the terminal node, the connection can fundamentally not be set up. The tandem nodes know from the preceding through-connection procedure that E is the terminal node and know from the returned telegram that E cannot switch they therefore return the telegram back to the start node A and subsequently clear down their through-connections.

When a tandem node such as node C is already not in the position to forward the connection, then it answers back as auxiliary starter:

ST,KPBV,A3,C0:1,ET

The preceding node, node A in the example—would then attempt to forward the connection via the next node that resides in its table (according to the table in A, second attempt to node D).

Even given disturbances of DSV, alternate routings can be undertaken proceeding either from one of the terminal nodes or from a node lying directly at the disturbed DSA with this method without a central computer having to be involved in controlling fashion.

In order to achieve as optimum a DSV routing as possible, the lists to be kept on hand in the network nodes are to be correspondingly compiled. For example, this could occur with a central computer having extensive network knowledge that, however, need no longer directly switch but updates the lists time-uncritically. For example, an optimization could also ensue in that an attempt is made to reach the destination via different tandem nodes and to ultimately connect the path that leads via the fewest nodes.

7. Searching and Switching a DSV Route without Central Computer for DSV Having Special Structure The method set forth under 6 for path searching can also be used for switching DSV with special signals. To this end, it is necessary to inform the participating nodes during the set-up and check procedure that the DSV to be set up will carry a special signal.

This can occur in that the parameter z is expanded by a possible value in the identifier Kxyz (mnemonic representation):

z=S: Operating node of connection check for DSV with special signal structure.

There is the possibility that the type of signal in the telegram is additionally specified in greater detail, so that the nodes can immediately loop corresponding special monitoring units in insofar as they are present.

When the signal type is not specified in greater detail, then, after the through-connection in the terminal nodes, i.e. when the special signal is already carried in the DSV, the individual nodes can attempt to independently find a suitable special monitoring unit in that they successively loop the connection via the special monitoring units present in them until a valid structure is recognized. Given non-recognition, the signal is directly through-connected. It must thereby be noted, however, that the DSV may still be potentially disturbed for some time after the through-connection due to the searching.

Another modification represents the fundamental limitation of the looping via special monitoring units at the terminal nodes. In any case, the node that starts the switching knows the type of special signal involved. The terminal node thus need only seek the suitable special monitoring unit and loop the DSV thereover.

As set forth under Point 6, the start node A releases the through-connection in E in that it itself through-connects and changes the operating mode to monitoring in the identifier. The standard monitoring unit in the terminal node E thus reports the lack of the normal structure. The node E knows from the check phase that a special signal is to be carried and now begins to search for the suitable special monitoring unit. It continues to transmit PDS back to A during the search.

When it has found the suitable unit, E loops the signal via this special monitoring unit and through-connects. The special signal is thus also transmitted in return direction, the normal monitoring telegrams being now carried therein.

Figure 9:
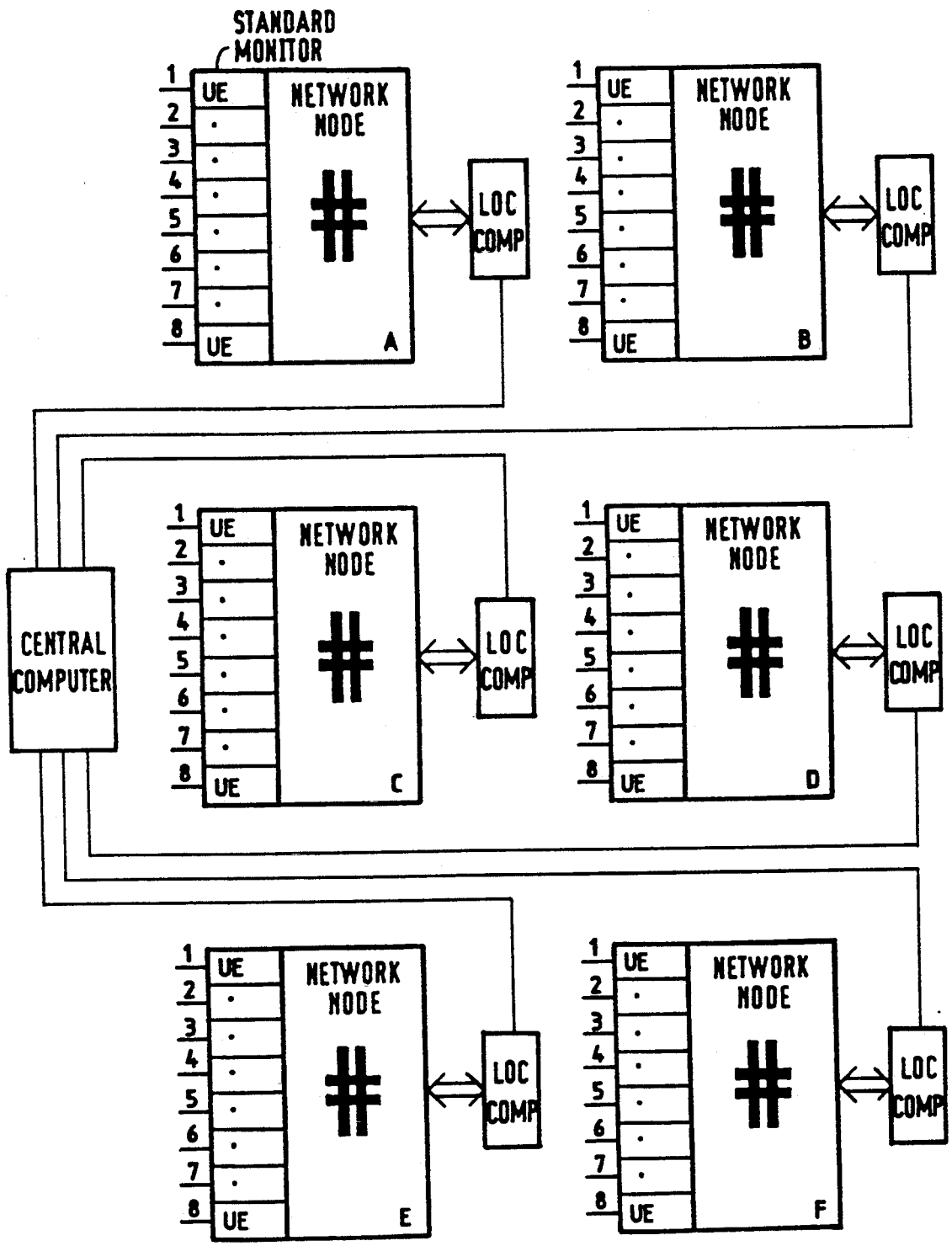
FIG. 9 depicts the coupling of respective network nodes to local computers, and the connection of local computers to a central computer.

When E does not find a suitable special monitoring unit, then it transmits PDS with the information "auxiliary starter" to A. A recognizes therefrom that the connection cannot be set up since the terminal node at the other end is not adequately equipped in hardware terms. The clear-down of the connection then ensues as set forth under 6. FIG. 9 depicts the coupling of respective network nodes to local computers (LOC COMP), and the connection of the local computers to a central computer.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for acquiring network knowledge in a digital transmission network for transmitting digital signals, said digital transmission network having network nodes operating as terminal or tandem nodes that contain electronic distributors having circuits that have network knowledge available to them and to which local computers are connected, having digital signal sections connected between the network nodes, having a central computer that is connected to the local computers, and having digital signal connections that can be switched and monitored from a starting terminal node via tandem nodes to a destination terminal node, comprising the steps of: repeatedly transmitting a telegram from the starting terminal node to the destination terminal node and a telegram from the destination terminal node to the starting terminal node, each of said telegram having a start character, having starter data containing an identification of type of signal and operating mode as well as an identification of both terminal nodes and having an end character; storing the telegram in every tandem node; and reporting by both terminal nodes with reference to incoming telegrams a correct switch of the digital signal connection to the central computer and the latter initiating the through-connection of a digital signal; or, given outage of the central computer, through-connecting the digital signal in the network nodes dependent on the stored information of the received telegrams.

2. The method according to claim 1, wherein the digital signal is monitored for being a standard signal denoting that a respective digital signal section lies in a switched digital signal connection or being an alternate signal denoting that a respective digital signal section lies in a disturbed digital signal connection or being a check signal denoting that a respective digital signal section is free.

3. The method according to claim 2, wherein the method further comprises the step of: providing standard monitoring units at input ports of distributors of the network nodes and additionally providing separate monitoring units within the network nodes and looping the digital signal connection via the separate monitoring units.

4. The method according to claim 3, wherein the method further comprises the step of: successively offering the digital signal to all separate monitoring units within the network nodes for specifying the type of the digital signal.

5. The method according to claim 4, wherein the method further comprises the step of: through-connecting the digital signal in the network nodes directly when the type of signal is not specified in the separate monitoring units.

6. The method according to claim 2, wherein a tandem or a terminal node in a digital signal connection can transmit a telegram having auxiliary starter data with identification of the digital signal as an alternate signal.

7. The method according to claim 1, wherein every network node that receives a telegram supplements the telegram with its own information.

8. The method according to claim 1, wherein the telegram contains information about the first network node and the destination terminal node of the connection and about the network nodes that have already been traversed.

9. The method according to claim 1, wherein the telegram is protected by check bits.

10. The method according to claim 1, wherein the method further comprises the step of: given outage of the central computer, through-connecting the digital signal in the network nodes by means of lists available in the local computers of the network nodes.

11. The method according to claim 1, wherein the method further comprises the step of: performing a plurality of automatic path searches over different paths, and through-connecting the path that leads via the fewest network nodes.

12. A digital transmission network for digital signals comprising:
network nodes operating as terminal or tandem nodes that contain electronic distributors having circuits that have network knowledge available to them;
digital signal sections connected between the network nodes;
local computers connected to the network nodes;
a central computer connected to the local computers;
digital signal connections that can be switched and monitored from a starting terminal node via tandem nodes to a destination terminal node;
transmitting means in the local computers of the starting terminal node and the destination terminal node for repeatedly transmitting in the direction of the opposite terminal node a telegram having a start character, having starter data containing an identification of type of signal and operating mode as well as an identification of both terminal nodes, and having an end character;
storage means in the local computers of each tandem node for storing the telegram;
control means in the local computers of both terminal nodes for reporting with reference to incoming telegrams a correct switch of the digital signal connection to the central computer having control means for initiating the through-connection of the digital signal; and
control means in the local computers of the network nodes for, given outage of the central computer, through-connecting the digital signal dependent on the stored information of the received telegrams.

13. The digital transmission network according to claim 12, further comprising standard monitoring units for monitoring the digital signals and separate monitoring units for monitoring the digital signals, said separate monitoring units being looped in the path of the digital signal connection within network nodes.

* * * * *